United States Patent [19]

Hallauer et al.

[11] 3,743,458

[45] July 3, 1973

[54] APPARATUS FOR INJECTION MOLDING ARTICLES CARRYING DECORATIONS PUNCHED FROM A BAND

[75] Inventors: Siegfried Hallauer; Gaston Mathys, both of Zurich; Hans Wenk, Fallanden, all of Switzerland

[73] Assignee: Ornapress AG, Schwerzenbach, Switzerland

[22] Filed: Oct. 12, 1970

[21] Appl. No.: 80,055

Related U.S. Application Data

[63] Continuation-in-part of Ser. No. 654,249, July 27, 1966, abandoned.

[30] Foreign Application Priority Data

July 22, 1966 Switzerland.................... 10835/66

[52] U.S. Cl................. 425/122, 425/129, 264/275, 425/112
[51] Int. Cl............................................. B29f 1/10
[58] Field of Search................ 18/30 UM, 19 P, 2 J, 18/36, 42 D; 264/19 R, 153, 275, 94; 425/126, 122, 129, 112

[56] References Cited
UNITED STATES PATENTS

| | | | |
|---|---|---|---|
| 2,811,744 | 11/1957 | Baldanza...................... | 425/122 X |
| 1,880,858 | 10/1932 | Davis............................ | 18/19 P |
| 3,342,915 | 9/1967 | Wanderer..................... | 18/19 P X |
| 3,466,214 | 9/1969 | Polk et al...................... | 18/19 R X |
| 3,272,681 | 9/1966 | Langeeker..................... | 264/98 X |
| 3,270,101 | 8/1966 | Jardine.......................... | 264/275 X |
| 3,324,508 | 6/1967 | Dickinson...................... | 264/275 X |
| 3,684,418 | 8/1972 | Langecker..................... | 425/122 |

FOREIGN PATENTS OR APPLICATIONS 624,786  11/1963  Belgium............................. 18/19 P

*Primary Examiner*—J. Spencer Overholser
*Assistant Examiner*—David S. Safran
*Attorney*—Werner W. Kleeman

[57] ABSTRACT

A method of decorating articles formed by injection molding wherein a foil carrying markings in the form of ornamentations or inscriptions is united with the article. The invention contemplates introducing the foil in the form of a band into a mold comprising three parts, namely a first mold portion, a cooperating female mold element and a cutting male mold portion and punching out by means of said mold a foil piece carrying the desired marking from the foil in band form. The punched-out foil piece remaining in the mold is then united with the article, and thereafter the mold is opened and the foil in band form is advanced through a predetermined cyclic increment. The inventive apparatus for the decoration of molded articles comprises a mold having a mold compartment, such mold being provided with the aforesaid first mold portion, cutting male mold portion and cooperating female mold element. The cutting male mold portion and female mold element collectively form a punching tool means for punching-out foil pieces from a foil which is in substantially band-like form. The cutting male mold portion has a front end which limits the aforesaid mold compartment. At least one of the mold portions is equipped with shoulder means thereat for transmitting the closing pressure to the female mold element. During relative movements of the three parts of the mold towards one another by a single drive both mold closing and foil cutting is performed. Electrostatic charging of the foil is also utilized for promoting adherence of the foil to the cutting male mold portion.

7 Claims, 3 Drawing Figures

United States Patent [19]
Hallauer et al.
[11] 3,743,458
[45] July 3, 1973
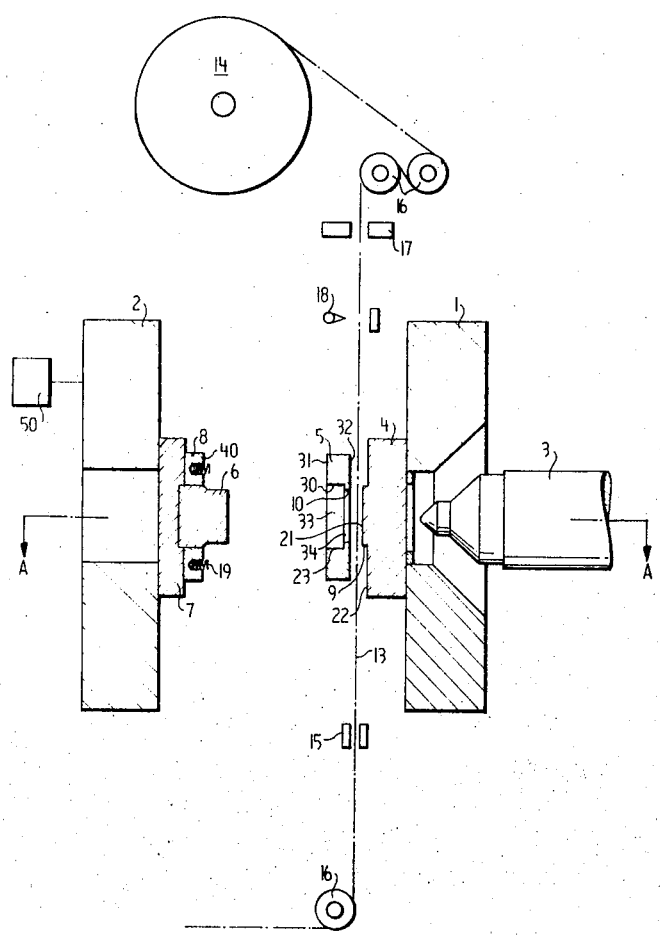

APPARATUS FOR INJECTION MOLDING ARTICLES CARRYING DECORATIONS PUNCHED FROM A BAND

BACKGROUND OF THE INVENTION

The instant application is a continuation-in-part of our copending, commonly assigned, U.S. application, Ser. No. 654,249, filed July 27, 1966, now abandoned, and entitled "Method of Ornamentation and Inscription of Plastic Articles and Apparatus for the Performance of the Aforesaid Method."

The present invention relates to an improved method of decorating articles, namely the ornamentation or inscription of plastic articles which are manufactured by injection molding, by uniting a foil carrying the printed ornamentation or inscription with the article, and this invention further relates to an improved apparatus for carrying out the aforesaid method. In the description to follow the foil which is in substantially band-like form will be considered as carrying the so-called "markings," and this term is used in its broader sense to encompass ornamentations, inscriptions, letters, patterns, indicia and generally any type of marking which is used to adorn or decorate the article. Further, the term "decoration" as employed herein is also, therefore, used in its broader sense to encompass the ornamentation, inscription, or adornment of articles with such so-called markings.

Now, for the decoration of molded articles formed of thermoplastic or thermosetting plastics, it is already known to the art to combine or unite the article with a foil which serves as carrier for a printed marking in the form of an ornamentation or inscription or the like. This uniting or laminating of the foil with the article can take place during the manufacture of such article or subsequent thereto. The relevant transparent or translucent foil preferably consists of the same or kindred plastic material as the material from which the article is manufactured. This foil is previously printed or otherwise impressed with the marking at that side of such foil which is subsequently to be united with the article which is to be decorated. As a result, it is insured that the printed image at the finished article is protected against wear, smudging or blurring.

A relatively thin fiber layer is preferably employed as the color carrier for articles formed of thermosetting material. This fiber layer is printed with the type characters or the ornamentation and is impregnated with a resin which can be combined with the material of the article by a thorough cross-linking.

With the previous modes of manufacture the printed foil is initially cut-out or punched-out and then manually inserted into the injection- or die forming-mold. Under the action of heat and generally also by pressure it is combined with the base body member. The manual insertion of such foil requires a very careful manner of operation, since the positioning of the foil relative to the mold or workpiece during insertion is decisive for the subsequent position of the inscription or ornamentation at the finished article. More precisely, if great demands are placed upon the exact position of the foil, for example when manufacturing scales or the like or when the foil must be disposed in a predetermined relationship to other locations of the article, it is possible for a high quota of rejects to occur if there is an inaccurate mode of operation. Furthermore, the operating cycle or rhythm of the machine is oftentimes limited by the working speed necessary for the depositing or insertion of the foil.

SUMMARY OF THE INVENTION

Accordingly, it is a primary object of the present invention to effectively overcome these problems which existed in the prior art techniques and apparatus for the decoration of molded articles.

Another, more specific object of the present invention relates to an improved method of, and apparatus for, decorating molded articles in an extremely efficient and reliable manner, requiring a minimum of time for the proper positioning of the foil carrying the marking with respect to the article which is to be united with such foil.

Still a further significant object of the present invention relates to an improved method of, and apparatus for, effectively decorating articles by means of a foil carrying markings in the form of ornamentations, inscriptions or the like, wherein production times are greatly improved and manufacturing costs thereby reduced, while at the same time insuring for proper positioning of the foil in relation to the article so that the chance of rejects is considerably reduced.

Still a futher significant object of the present invention pertains to an improved method of, and apparatus for, decorating molded articles in an extremely reliable, efficient and quick manner wherein cutting or punching out of the foil piece carrying the marking and which is to be applied to the manufactured article is undertaken directly in the same mold unit used for the manufacture of such article, thereby minimizing the danger of mispositioning or inaccurate insertion and orientation of the cut foil piece.

Another significant object of the present invention relates to an improved method of decorating injection molded articles, and apparatus structure for the performance of such method, wherein a common drive serves to relatively move three mold parts of the injection molding structure with respect to one another, to thereby both close the mold and simultaneously cut-out the foil piece from the foil web used for decorative or adornment purposes.

Still a further significant object of the present invention relates to the provision of injection molding apparatus incorporating a three-part mold unit operated by a common drive for closing the mold, and wherein at least one of the mold parts has shoulder means for transmitting the closing pressure to a female mold part, and preferably the remaining mold part likewise has shoulder means for absorbing the transmitted pressure.

Now, in order to implement these and still further objects of the invention which will become more readily apparent as the description proceeds, the inventive method of decorating injection molded articles generally comprises the concepts of providing a three-part mold embodying a first mold portion, a cutting male mold portion and a female mold portion, arranged in spaced relationship to one another, and providing a foil band of greater width than the width of such mold portions with a series of regularly longitudinally spaced markings of less width than the width of such band. The foil band is intermittently fed between and past the cutting male mold portion and the female mold portion and during such feeding operation the foil band may be electrostatically charged. The intermittent feeding operation is stopped in such a way that the foil band with a marking thereon is in registry with the female mold portion, and thereafter relative movement of the mold portions towards one another is undertaken so as to initially cut such marking out of the band which is adherred to the male mold portion by means of the applied electrostatic charge as the edge of the male mold portion moves past the edge of the female mold portion, and thereafter in cooperation with such female mold portion closing the mold cavity. Injection moldable material is then injected into such cavity to unit the injection moldable material with the cut-out marking and to form an article. The material is then allowed to set, relative movement of the mold portions away from one another is undertaken to open the mold portions, whereafter the molded marked article is removed, and the controlling, relatively moving, introducing, setting and removing steps, noted above, are cyclically repeated.

By virtue of the above, the foil is stamped or punched-out directly at the machine, so that there is obtained a more exact reproducability of the foil position relative to the article than can be achieved if the foil is manually inserted. Apart from this, in most cases the operating speed can be increased. Also, it is to be noted that advantageously a single operation serves to both close the mold and cut the foil, and again advantageously a common drive can be utilized to serve both purposes.

Insofar as the inventive apparatus for the decoration of injection molded articles is concerned, such as manifested by the features that there is provided a mold structure formed of three parts and having a mold compartment. More precisely, the mold itself incorporates a first mold portion, a cutting male mold portion and a cooperating female mold, the female mold and cutting male mold portion collectively forming a punching tool means for punching-out foil pieces from a foil which is in substantially bandlike form. Furthermore, the cutting male mold portion includes a front end which limits the mold compartment. A common drive is utilized for effectuating relative movement of the three parts of the mold with respect to one another to thereby both close the mold and to carry out the foil cutting operation. Additionally, one of the mold portions is provided with shoulder means for transmitting the mold closing pressure to the female mold portion which, in turn, is thereby moved relative to the other mold portion for closing the molding or mold compartment. The other mold portion also may be provided with shoulder means for absorbing the transmitted mold closing pressure. The invention further contemplates mechanism for electrostatically charging the foil band or web so that good adherence of the cut foil pieces to the cutting male mold portion is insured.

BRIEF DESCRIPTION OF THE DRAWINGS

The invention will be better understood, and objects other than those set forth above, will become apparent, when consideration is given to the following detailed description thereof. Such description makes references to the annexed drawings wherein.

DESCRIPTION OF THE PREFERRED EMBODIMENT

Figure 1:
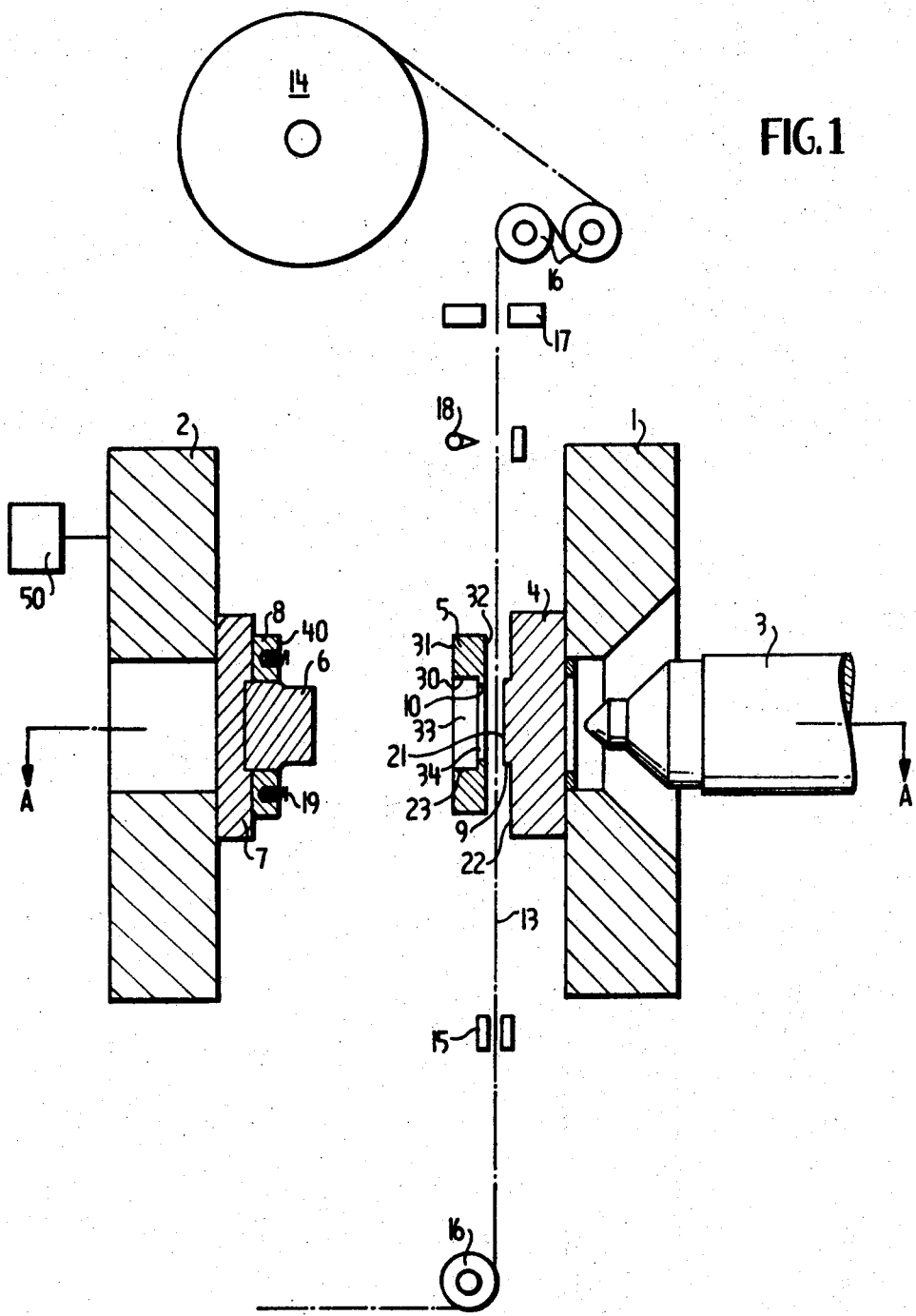
FIG. 1 is a vertical sectional view through a preferred embodiment of inventive injection mold which is depicted in the open position and employed for carrying out the inventive method.

Describing now the drawings, the illustrated exemplary embodiment of plastic injection molding device comprises a stationary mounting or tensioning plate 1 located at the injection side of the machine and a movable mounting or tensioning plate 2 which is located at the closure side. A conventional injection head or cylinder 3 serves for the infeed of the fluent injection moldable material. A cutting male mold portion 4 having shoulder means, here shown as substantially flat, stepped shoulders 22 of relatively large area, is rigidly secured to the mounting plate 1. Furthermore, a female mold portion 5 is provided which is separated from the cutting male mold portion 4. Between this cutting male mold portion 4 and the female mold portion 5 there are located non-illustrated guide elements which serve to insure that the components 4 and 5 exactly fit one another and, further, when the mold is opened that they are separated from one another.

Continuing, it will be recognized that a base plate 7 is rigidly secured to the movable plate 2 driven by the schematically indicated drive mechanism 50 of FIG. 1. A stripper plate 8 and a mold die or punch 6 are seated upon the base plate 7 and define a further mold portion. The mold stripper plate 8 likewise possesses shoulder means 40 which here serve to transmit the mold closing pressure to the female mold portion or element 5. Further, a substantially band-like shaped foil 13 extends between the cutting male mold portion 4 and the female mold portion 5. At the side of this foil 13 which faces the female mold portion 5 there are printed the markings in the form of ornamentations, inscriptions, letters, patterns, indicia or the like. The same printed image repeats at certain fixed distances from one another along this foil 13 which serves as the color carrier. This foil 13 with its so-called "repeat patterns," which are in the form of printed pictures or the like arranged behind one another on such foil, is paid off a wound supply roll 14 and guided past deflecting or guide rollers 16 or equivalent expedients. Further, this foil 13 is transparent or at least translucent at those locations which are not printed and carries the printed images or the like at the side facing the female mold portion 5. These printed images or patterns can be single- or multi-colored.

A suitable feed or transport device 15 is provided for the cyclic or rhythmic conveying of the foil 13. This transport device or mechanism 15 insures for the proper feed of the foil 13 in a mechanical, electrical, pneumatic or hydraulic manner as is known in the art. Further, such transport device 15 is controlled by the injection molding machine through the agency of a suitable non-illustrated terminal switch and, when the mold is opened, advances or pulls the foil 13 forwardly such an extent until the next repeat pattern or printed image is exactly disposed at the desired location above the female mold element or portion 5. The exact positioning of the printed image or repeat pattern is controlled with the aid of a photocell unit 17 by means of printed marks or by means of the printed image or repeat pattern itself. A so-called spray electrode 18 which serves to electrostatically charge the foil 13 is located in front of or upstream of the mold unit as viewed in the direction of travel of this foil 13.

After the foil 13 has been advanced by one step or cadence then closing of the injection molding machine is undertaken, whereby initially, in the exemplary embodiment, by means of the drive mechanism 50 the mounting plate 2 is displaced in a direction towards the mounting plate 1. As a result, the female mold portion 5 first comes to bear against the spring members 19 of the stripper plate 8 and finally the shoulder means 40. During the further closing movement there takes place the punching-out or stamping-out of the printed image or pattern from the band-shaped foil 13. Specifically, this is achieved by means of the stamping or punching edges 9 provided at the cutting male mold portion 4 and which cooperate with the stamping or punching edges 10 provided at the female mold portion 5. This cutting male mold portion 4 has a front end 21 serving to limit the hollow mold compartment 30 and the female mold portion 5 has lateral wall means 23 which also limit such mold compartment 30.

Figure 3:
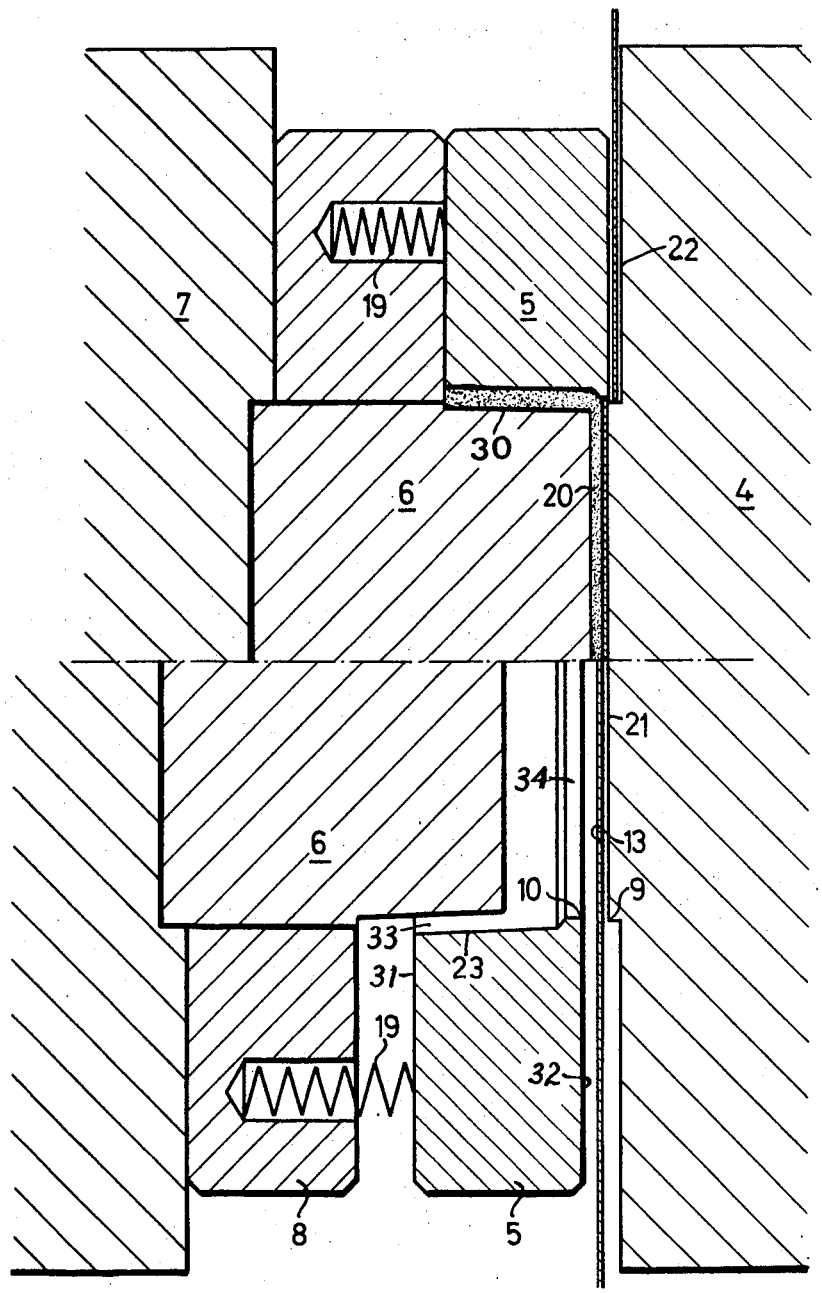
FIG. 3 is a vertical sectional view analogous to that shown in FIG. 1 but on an enlarged scale and showing details of the mold unit.

As shown in FIGS. 1 and 3, a female mold portion 5 is provided with major surfaces 31, 32 substantially in parallel relationship, the former facing toward the male mold portion 4, the latter facing away from the male mold portion 4. The major surface 31 is interrupted by the inwardly extending lateral walls 30 to define a cavity 33. The major surface 32 is interrupted by an inwardly extending stamping edge 10 to define a cavity 34 which communicates with the cavity 33.

Figure 2:
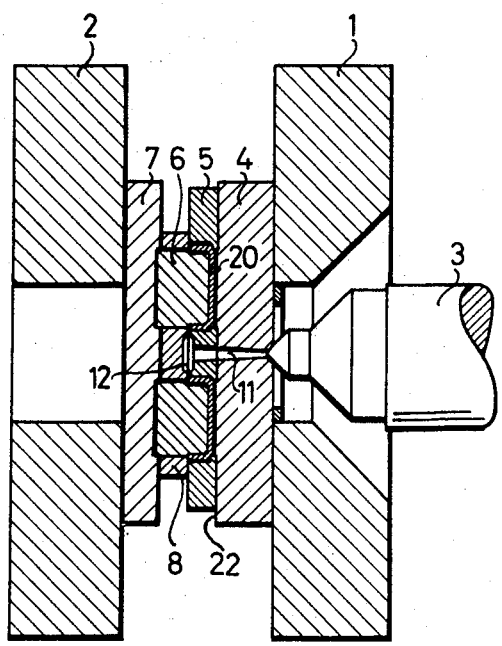
FIG. 2 is a sectional view of the mold unit depicted in FIG. 1, taken substantially along the line A—A thereof, and with such mold unit in the closed position.

After the punching or stamping operation the punched-out foil piece remains adhered to the cutting male mold portion 4 owing to the electrostatic charge, whereas the mold further closes until it finally achieves the closed position depicted in FIG. 2. The width of the foil band 13 is maintained larger than the width of the punched-out foil piece, so that the remainder of the foil 13 which has not been punched out remains clamped between the cutting male mold portion 4 and the female mold portion 5.

Now, the injection molding material is injected via a sprue runner or channel 11 into a running or distributor 12. As a result, the injection molding material arrives between the stripper plate 8 and the female mole portion 5 in the hollow molding compartment or cavity 30 and fills the latter. Consequently, the injection molding material fixedly unites or attaches to the punched-out foil piece which adheres to the cutting male mold portion 4. After cooling of the plastic mass the mold is opened. During this opening operation the female mold portion 5 is initially retained at the cutting male mold portion 4 by means of non-illustrated pawls or the like.

The molded articles 20 adhering to the mold punch means 6 are thereafter stripped by means of the mold stripper plate 8. At the same time or subsequent thereto the pawls which hold back the female mold portion 5 are released and there is again provided the spacing between the cutting male mold portion 4 and the female mold portion 5 which is necessary for the feed of the foil 13. In the event that this foil 13 has not already been pulled-off of the cutting male mold portion 4 owing to the tension of the stretched foil, then stripping of this foil 13 from the shoulder means 22 of the male mold portion 4 can be assisted by means of compressed air or the like. Thereafter, the transport or feed device 15 is once again placed into operation and the foil 13 is pulled forwardly to such an extent until a new repeat pattern or printed image is located at the desired position, whereupon the previously described cycle repeats.

Control of the feed movement can also be carried out mechanically instead of by a photocell unit 17. In such case, the foil 13 is provided during the printing operation with cut-out notches or the like by means of which it is likewise possible to achieve an exact feed control. Furthermore, instead of using a single injection mold it would also be possible to employ a multiplemold, in which case, an appropriate number of printed patterns or the like as well as punching tools must be provided.

Additionally, it will be understood that the common drive means 50 serves to both displace the mold portions relative to one another to bring about closing of the mold as well as cutting of the foil, thereby providing a synchronized and accurate operation of the equipment inasmuch as no separate drives are required for each function. Moreover, in the present case where the tensioning plate 2 is driven by the drive unit or mechanism 50 the shoulder means 40 of the mold stripper plate 8 serves to transmit the mold closing pressure to the female mold portion 5 which, in turn, transmits such mold closing pressure to the cutting male mold portion 4. The shoulder means 22 of the cutting male mold portion 4 then absorb the transmitted pressure. Of course, the reverse function of the shoulder means 22, 40 would be possible in the event that the drive unit is designed to advance the cutting male mold portion 4 in the direction of the female mold portion.

Furthermore, it should be understood and appreciated that the inventive method is not limited to flat objects, rather can also be employed for such articles in which the punched-out foil which is welded with the molded article partakes a relief-like condition, for instance ash trays.

Finally, instead of electrostatically charging the foil the latter can be equipped with adhesive means which bring about the proper adhesive between the punched-out foil piece and the punch.

While there is shown and described present preferred embodiments of the invention, it is to be distinctly understood that the invention is not limited thereto, but may be otherwise variously embodied and practiced within the scope of the following claims. Accordingly,

What is claimed is:

1. Injection molding apparatus including means for the decoration of molded articles by applying thereto marked pieces of foil cut out of a foil band, comprising means defining a mold having a molding compartment therein, said means including a first mounting plate and a second mounting plate movably spaced from said first plate, a cutting male mold portion secured to one of said mounting plates, a further mold portion and a cooperating female mold portion positioned between said plates in movable contact with said cutting male mold portion, said cutting male mold portion and female mold portion which together form a punching tool means for punching out marked places of foil from such foil band, means for moving said cutting male mold portion and said cooperating female mold portion relative to each other so that said molding compartment can be open to receive such foil band between the cutting male mold portion and the female mold portion and can be closed to effect punching out of a marked piece of foil and the molding and decorating of an article, said cutting male mold portion including a front end which limits said molding compartment, supply means for intermittently feeding a foil band which is provided with a series of markings between said cutting male mold portion and the cooperating female mold portion, means for controlling the feed movement of such foil band and thereby achieving the exact position of a marking of such foil band in registry with said male and female mold portion, each of said male and female mold portions including shoulder means for receiving the transmitted closing pressure to said female mold portion during closing of said molding compartment and for supporting said foil during said punching, said female mold portion shoulder means having first and second major surfaces in substantially parallel relationship, one of said major surfaces facing away from said male mold portion, the other said major surface facing toward said male portion, said first surface interrupted by inwardly extending lateral walls defining a first cavity, said second surface interrupted by an inwardly extending stamping edge defining a second cavity smaller than said first cavity which communicates with said first cavity, said front end of said male mold portion being substantially the same size and shape as said female mold cutting edge but yet small enough to be received in said second cavity portion for cutting said foil.

2. The apparatus as defined in claim 1, wherein said female mold element incorporates lateral wall means for limiting said molding compartment.

3. The apparatus as defined in claim 1, wherein said means for moving said cutting male mold portion, said cooperating female mold element and said further mold portion relative to each other comprises a drive mechanism which conjointly serves to close the mold cavity and effectuate cutting of the foil band through the cooperative working relationship between the cutting male mold portion and the cooperating female mold element.

4. The apparatus as defined in claim 1, wherein the shoulder means of said cutting male mold portion possess a substantially stepped configuration.

5. The apparatus as defined in claim 1 wherein said first mounting plate is stationary and said male mold portion is secured thereto.

6. The apparatus as defined in claim 1 wherein said shoulder means provided at each of said male and female mold portions are defined by substantially flat surfaces.

7. The apparatus as defined in claim 1 wherein said female mold portion cavity is adapted for receiving a mold punch movably operated by said movable mounting plate.

* * * * *